United States Patent Office 3,018,893
Patented Jan. 30, 1962

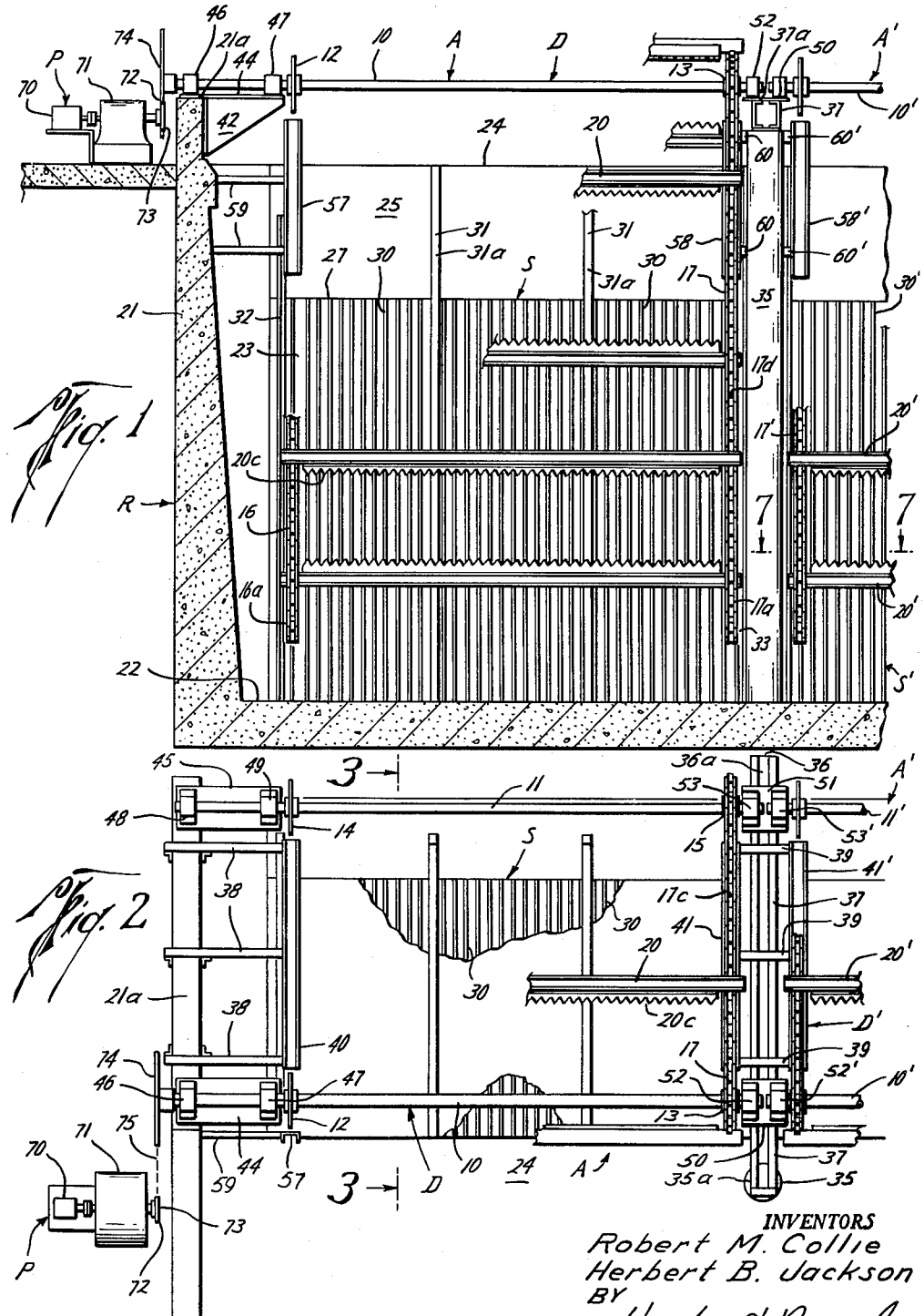

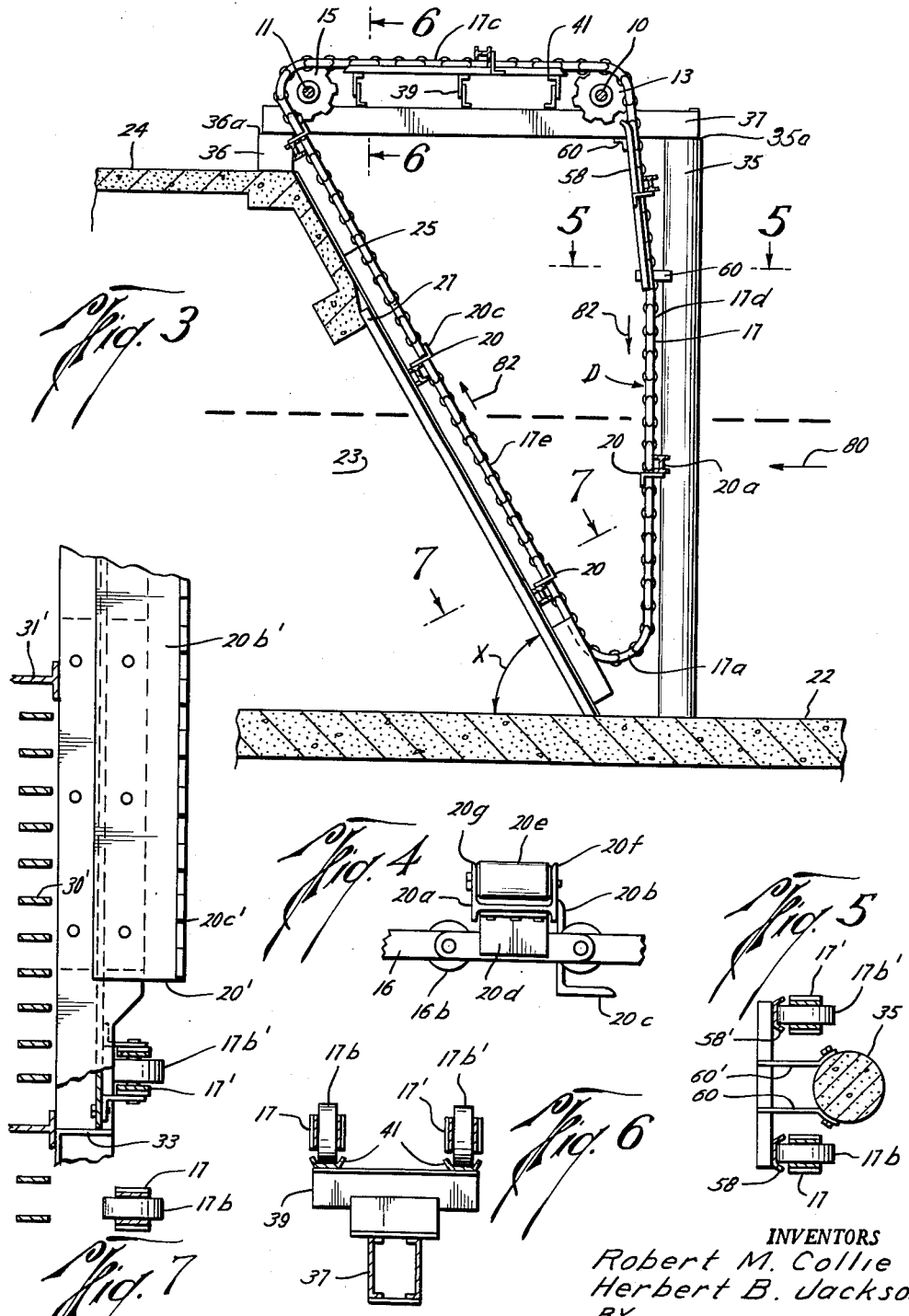

3,018,893
MECHANICAL TRASH RAKE
Robert M. Collie, 6158 Del Monte, Houston 27, Tex., and Herbert B. Jackson, 1518 Pine Chase, Houston 24, Tex.
Filed Apr. 25, 1960, Ser. No. 24,447
2 Claims. (Cl. 210—159)

The present invention relates to a new and improved apparatus and arrangement for removing debris, trash and similar material from a moving body of water.

Water received in pumping stations such as those found in irrigation projects, or in pumping stations which are arranged for collection and disposal of surface waters, as well as pumping stations in other situations such as in commercial installations, are subject to becoming fouled by reason of foreign objects in the water. The foreign objects may damage the pumping equipment and thereby necessitate repair or replacement of the equipment, which operation may require the pumping station or a portion of it, to be removed from service at a most inopportune time.

Various devices have been suggested for removing objects from water before discharging it into a pumping station, however, all of such devices are objectionable in that they are expensive to build and install, and additionally their arrangement has been such that frequent repair or replacement is necessary and is expensive. Additionally, the devices have been constructed so that operating parts of the mechanism are submerged in the water, thereby subjecting the mechanism to undue wear and corrosive action from the water, and making it extremely difficult to repair or replace those parts of the device which are submerged.

Generally speaking, a device to be practical and satisfactory for removing trash and debris such as tree limbs, tin cans, other pieces of metal and any other foreign object from water which is flowing into a pumping station must accomplish its function so as to not interfere with the flow of water into the station, and must accomplish its function in a most economical and practical manner.

The present invention is extremely advantageous in that it overcomes all of the disadvantages of prior art trash rake constructions which are adapted to remove debris from a flowing body of water, and provides an arrangement which is not only positive in its function, but which accomplishes this function with a minimum of moving parts.

The present invention is constructed and arranged so that it may be mounted adjacent the water opening of a pumping station and is provided with a screen on which the debris or trash is adapted to be received, and a rake mechanism which is supported adjacent the screen and is moved there against in order to collect the debris and rapidly and quickly lift it out of the water and deposit it on a platform adjacent the screen. More particularly, the construction of the present invention is such that the rake member moves downwardly into the flowing body of water in a manner so as to offer a minimum of resistance to the water flowing toward the screen, and to offer a minimum of resistance to debris which may be moving along with the water. This is extremely advantageous in that most prior art devices have provided a construction and arrangement wherein the rake member moves into the water in a manner to resist the flow of water and the flow of debris towards the screen.

Also the present invention is constructed and arranged so that all support mechanism for the devices is arranged above the water level making it easier to install and reducing maintenance and upkeep.

One of the principal objects of the present invention is to provide a new and improved apparatus for removing trash, debris and other material from a moving or flowing body of water which eliminates the need for gears, sprockets, shafts, confining guide means and other similar types of mechanisms being positioned in the water thereby considerably reducing maintenance and repairs.

Another object of the present invention is to provide a new and improved apparatus for moving debris, trash or other material which will continue to operate even though such debris, trash or other material may become between a submerged screen and the raking members moved thereover.

Still another object of the present invention is to provide a new and improved mechanical trash rake wherein the relationship of the raking members to a submerged screen and a platform extending above the screen and above a moving body of water is such that the raking members move above the platform so as to deposit any material raked from before the screen on such platform.

A further object of the present invention is to provide a new and improved apparatus for removing debris, trash and other material from a moving body of water wherein weight bearing guide members are positioned on a submerged screen thereby eliminating considerable wearing of the screen as raking members are moved thereacross.

Yet a further object of the present invention is to provide a new and improved mechanical trash rake wherein the raking members are sufficiently heavy that even if material becomes lodged between a submerged screen and the rake members the rake members will still move the material upwardly across the screen and onto a platform for further disposal.

Yet a further object of the present invention is to provide a new and improved device for removing trash, debris or other material from a body of water which may be readily adapted for use in existing liquid screening installations or in new construction.

Another important object of the present invention is to provide a new and improved apparatus for removing trash or other material from a body of water which may be installed as a single unit or as a plurality of units with each unit independently operable or operable in combinations as desired.

The construction designed to carry out the invention will be hereinafter described, together with the features thereof.

The invention will be more readily understood from a reading of the following specification and by reference to the accompanying drawings forming a part thereof, wherein an example of the invention is shown, and wherein:

FIG. 1 is a front elevation illustrating the apparatus of the present invention and shows how units may be joined together;

FIG. 2 is a plan view of the installation shown in FIG. 1;

FIG. 3 is a sectional view taken across line 3—3 of FIG. 2 and illustrates the position of the free falling endless chain;

FIG. 4 is a detailed side elevation illustrating the connection of a raking member on the chain;

FIG. 5 is a sectional view taken along line 5—5 of FIG. 3 and illustrates the position of the vertical chain guides and one means of mounting such guides;

FIG. 6 is a sectional view taken along line 6—6 of FIG. 3 and illustrates the positioning of the horizontal chain guides; and FIG. 7 is a sectional view taken across line 7—7 of FIG. 1 and illustrates the projecting guide member of the screen with a rake member thereon.

The apparatus of the present invention has numerous uses, each of which use generally requires some variation in supporting structure as well as modifications as to size, weight and type of material. The device of the present invention may be used wherever it is necessary or desirable to remove materials such as trash, debris or other matter from a body of liquid. It is especially useful in sewage water works, liquid pumping stations, drinking water plants wherein the water is derived from a river, stream, lake, reservoir or the like, irrigation ditches and industrial plants deriving their water from similar sources. The apparatus of the present invention may be adapted for use with existing structures or it may be specially designed for installation in new constructions.

In the drawings, the apparatus of the present invention is designated generally at A and is shown as it might be installed in a water pumping station. Such installation is for illustrative purposes only and no limitation of the invention is intended thereby. The apparatus A comprises the screen S adapted to be submerged in the body of liquid in which the liquid is to be screened as it passes, and the device D for removing any debris, trash or other material that might be collected on or before the screen S.

As the water moving into a reservoir R normally carries a certain amount of debris, trash and other material which would damage or foul the water pump in the pumping installation, it is necessary that such material be removed from the water prior to the water entering the pumps. The screen S performs the function of filtering or screening the water from the reservoir R before the water reaches the pumps in the pumping station for such further use as desired. Over a period of time a large amount of such trash and other material is collected before or on the screen S and if not removed would ultimately cause a dam to be formed and the water could not be directed into the pumps. It is therefore the function of the device to move such trash and material from before such screen S and on a platform above the water for further disposition so that the flow of the water through the screen S is unimpaired.

The device D includes the drive unit or power source P which provides the power for operating the device D, a drive shaft 10, an idler shaft 11, a pair of spaced apart chain sprockets 12 and 13 secured to the drive shaft 10, and a similar pair of chain sprockets 14 and 15 secured to the idler shaft 11, a pair of endless chains 16 and 17 positioned on chain sprockets 12, 14 and 13, 15, respectively, a plurality of raking members or rake beams 20 and suitable guides and supports all of which will be discussed more in detail hereinafter.

In FIGS. 1–3, the screen S is shown positioned in a reservoir R which is shown in section and has sides 21 and a bottom or floor 22. The reservoir R has an opening 23 which leads into the pumping station (not shown) behind the screen S. A platform 24 extends across the reservoir R and has a laterally projecting side 25 which extends downwardly and inclined towards the water and which forms the support for the upper end 27 of the screen S.

Normally the height of the screen would be such that the top of the screen coincides with the high water mark of the body of water. It is also preferred that the screen S does not extend to the top of the platform 24 and therefore the necessity for the laterally projecting side or screen support 25.

The screen S is secured to the floor 22 of the reservoir R by any suitable means in the opening 23 and is inclined or sloped upwardly preferably whereby the angle indicated by X is approximately sixty degrees, the reason for which will be explained hereinafter. The screen S may be mounted in the opening 23 in any suitable manner such as embedding in the concrete, anchoring with bolts or by any other suitable means, and is comprised of a plurality of vertically extending bars 30 which are approximately parallel to each other and are sufficiently close enough together to provide the desired screening of the body of water. Such bars 30 do not need to be exactly parallel, and in fact the screen S may be constructed in any manner desired as long as it performs the desired function. Heavier guide bars 31 such as an I-beam are positioned between the bars 30 so that one edge 31a projects or extends slightly above or outwardly of the bars 30. The edge 31a therefore forms a guide surface over which the raking member or bars 20 may be moved.

The guide bars 31 are of sufficiently heavy material such as steel or the like whereby the edge or surface 31a provides a weight bearing surface on which the raking members 20 are moved. The deterioration of the screen S is considerably lessened as the rake members 20 do not come into contact with the screen S. Such arrangement of the guide bars also provides for a minimum of friction when moving the beams 20 across or over the face of the screen S and therefore the device D can be operated by a smaller and more economical drive unit P than might otherwise be needed. The guide bars 31 extend upwardly above the bars 30 and preferably extend to the top of the platform 24. The guide bars 31 are preferably parallel to each other and spaced apart so that the raking members or beams 20 may rest substantially evenly thereon. The laterally extending surface 25 is also preferably parallel with the guide members 31 so that the guide members 31 may be mounted substantially adjacent such surface 25.

Raking member guides 32 and 33 are positioned on either side of the screen S and are in substantial alignment with the bars 30 of the screen S but extend upwardly above the bars 30 as illustrated in FIG. 1 in order to more adequately guide the raking members 20. The guides 32 and 33 inhibit lateral movement of the raking members 20 as the raking members 20 move across the screen S, but do not confine the chains 16 and 17 nor prevent the beams 20 from being moved away from the screen S should any trash, debris or other material become positioned between a raking member 20 and the screen S. The raking member 20 being of a substantial weight exerts sufficient pressure against such material to force it upwardly along the screen and onto the platform 24. Where additional units such as illustrated at A' are utilized the guide member 33 may be a channel member rather than an angle member as the member 32 and such channel member 33 may serve as the end guide for the raking members 20 and also the raking members 20' as such raking members 20 and 20' are moved across the screens S and S', respectively.

A pillar or column 35 is anchored to the floor 22 of the reservoir R by bolts or other suitable means and forms a portion of the support structure for the right side of the apparatus A and the left side of the apparatus A', as seen in FIGS. 1 and 2, and the reservoir wall 21 forms the supporting structure for the left side of the apparatus A. A beam support block 36 is mounted on the platform 24 and in line with the column 35, and the top 35a of the pillar 35 is of substantially the same height as the top 36a of the block 36. A pair of identical channel members 37 are anchored to the column 35 and the block 36 and rest thereon each. The top 37a of each of the channel members 37 is preferably on a level with the top 21a of the reservoir wall 21. The support members 37 are substantially parallel to the portion of the reservoir wall 21 directly opposite thereto. Support braces 38 are anchored to the reservoir wall 21 and support braces 39 are anchored to the channel members 37 for supporting the horizontal chain guides 40 and 41, respectively. Additional support braces 42 are anchored to the reservoir wall 21 and journal support plates 44 and 45 are mounted thereon for supporting the journals 46, 47 and 48, 49, respectively. Support plates 50 and 51 are mounted on the channel members 37 by welding or other suitable means and support the journals 52 and 53, respectively. The support plates 50 and 51 also support the journals 52' and 53' of the adjoining unit or apparatus A'.

The drive shaft 10 is mounted in the journals 46 and 47 on one end and the journal 52 on the other end. The drive shaft 10 as illustrated in FIGS. 1 and 2 does not extend beyond the apparatus A; however, if desired the drive shaft 10 and the drive shaft 10' of the apparatus A' could be joined together at journals 52 and 52' whereas the single drive unit P would operate the entire shaft 10, 10'. As illustrated in the drawings the shaft 10' is driven by a second power unit (not shown) similar to the drive unit P. Such an arrangement permits the continued operation of one unit or apparatus A should the unit A' become temporarily inoperable because of a surge of debris or some other reason.

A pair of identical rake chain sprockets 12 and 13 are secured between the journals 47 and 52 and aligned with the horizontal chain guides 40 and 41, respectively. An idler shaft 11 is mounted in the journals 48 and 49 on one end and the journal 53 on the other end in a manner similar to that of the drive shaft 10.

Identical rake chain sprockets 14 and 15, are secured on the idler shaft 11 between the journals 49 and 53 and in alignment with the horizontal chain guides 40 and 41, respectively. The idler shaft 11' of the apparatus A' is secured in the journal 53' in a manner similar to that of the idler shaft 11 in the journal 53.

In positioning the drive shaft 10 and idler shaft 11 there is a preferred arrangement between such shafts 10 and 11 and the screen S and platform 24. In such preferred arrangement the axis of the drive shaft 10 is approximately directly above the lower edge of the screen S and the axis of the idler shaft 11 is approximately directly above the edge of the platform 24 above the screen S. This arrangement permits the rake beams 20 to be moved upwardly across the screen S and above the platform 24 so that any debris or other material picked up or raked from the screen S is easily deposited on the platform, and also permits the lower end portions 16a and 17a of the chains 16 and 17, respectively to conform approximately to the natural curvature of such chains 16 and 17.

Vertical chain guides 57 and 58 are supported by braces 59 on the reservoir wall 21 and by braces 60 secured to column 35 and support members 37, respectively. The support brackets 60 and 60' for supporting the vertical chain guides 58 and 58' are best seen in FIG. 5 and the support brackets 39 for supporting the horizontal chain guides 41 and 41' are best seen in FIG. 6.

Identical rake chains 16 and 17 are mounted on the sprockets 12, 14 and 13, 15, respectively and in horizontal chain guides 40 and 41, respectively, and in vertical chain guides 57 and 58, respectively. The chains 16 and 17 are preferably made of steel or the like for substantial strength and of relatively long pitch with straight faced or flanged rollers 16b and 17b, respectively. The rollers 16b and 17b eliminate a substantial amount of friction and thereby provide for an overall smoother operation.

It should be noted that all of the supporting structure for the rake chains 16 and 17, such as the sprockets, 12, 13, 14 and 15, the drive shaft 10, idler shaft 11, journals 46, 47, 48, 49, 52 and 53, horizontal chain guides 40 and 41 and vertical chain guides 57 and 58 are positioned above the water. This arrangement increases the life of the supporting means and reduces the amount of maintenance and repairs. The device D is also less likely to become fouled from any trash or other material with which it may come into contact. Each of the chains 16 and 17 are substantially parallel to each other and as best seen in FIG. 3 are conformed to the approximate shape of a right triangle. The upper leg 17c of the triangle formed by the chain 17 extends horizontally or parallel to the top of the water. The vertical leg 17d extends substantially vertically from the sprocket 13 down into the water. The hypotenuse leg 17e extends parallel to the screen S whereby the chain 17 together with the chain 16 supported similarly to the chain 17 can move the rake members 20 over or across the screen S.

A plurality of raking members or beams 20, six in the illustrated installation, are connected between the rake chains 16 and 17 and are spaced approximately equidistant apart. The raking member 20 may be formed from a structural beam 20a with an angle member 20b secured longitudinally thereon with an upturned, serrated leg 20c thereon. An angle member 20d is connected to each end of the rake member 20 and is secured to the chain 16 on one end and the chain 17 on the other end by welding or other suitable means. The serrated or saw tooth edge 20c aids in catching or grasping any trash or other material collected before the screen S, and is secured to the rake beam 20 so that as the rake beam 20 moves upwardly across the screen S the edge 20c is the furthest portion of the rake beam 20 away from or above the screen S and is also substantially parallel to the screen S. This gives somewhat of a bucket effect and the raking members 20 can retain or hold a substantial amount of trash, debris or other material for depositing on the platform 24. The number of rake members used may be varied as desired, but it is generally preferred that they be spaced approximately equi-distant from each other. Also it is generally desired that the raking members be of substantial weight, and lead, cast iron or steel weights 20e may be bolted between the flanges 20f and 20g of the structural beam 20a to provide additional weight as needed or desired. A total weight of the rake member 20 of ninety pounds per foot has proven to give satisfactory performance.

The weight of the rake beams 20 provides assistance to the drive unit P as gravity tends to force the rake beams downwardly from the outer sprockets 12 and 13 as the chains 16 and 17 move in a clockwise direction (as viewed in FIG. 3).

The drive unit P preferably comprises an electric motor 70, a gear reducer 71 and a transmission assembly 72. The motor 70 may be of any desired type but is preferably a totally enclosed fan cooled motor. The gear reducers are preferably of the helical or herring bone type, but may also be varied as desired. The transmission assembly includes a precision steel roller chain-driver sprocket 73 mounted on a cut-out device or overload coupling. A precision steel roller chain-driven sprocket 74 is mounted on the head shaft 10 of the rake unit. A steel roller chain 75 operably connects the sprockets 73 and 74. The overload device is preferably set to disengage or kick-out at approximately one hundred percent of motor running torque.

Should the apparatus A be jammed by a surge of debris or other material the overload device will be actuated and the motor 70e will not be burned up or otherwise damaged. In the meantime the apparatus A' would continue to operate as in this case it has its own drive unit similar to the drive unit P.

As many units A may be used as desired or as is necessary and a single power unit P may be used to operate or drive each individual unit A or all of the units A, A' combined, in which in the latter case the drive shaft 10 would extend the length of the reservoir R to be screened or filtered. Various combinations of units and drive units may be easily devised for each specific installation.

The apparatus A is installed in such manner that the water flowing through the screen S flows in the direction indicated by the arrow 80, as best seen in FIG. 3. The power unit P is operated so as to cause the shaft 10 to move in such direction as to drive the chains 16 and 17 in the direction indicated by the arrows 82.

In the operation of the device of the present invention, the apparatus A, the flow of the water or liquid is normally such that it would cause material, debris, trash or the like to be collected on or before the screen S. If such trash and the like were not removed from before such screen the flow of the water would be considerably inhibited, and ultimately stopped. The raking members 20 of the apparatus A push the debris that has collected on the screen S upwardly and onto the platform 24. The trash collected on the platform 24 may be removed by hand or other suitable means as desired and as frequently as necessary. As the raking members 20 move over the guide members 31 and do not contact the bars 30 of the screen S a minimum amount of friction is encountered. The spacing of the rake members 20 and the weight of such members aids the unit P in its driving operation, thereby permitting the entire unit A to be driven by a motor 70 considerably smaller than would normally be necessary.

It should be noted that although the present invention has been illustrated in a reservoir R, the apparatus A or a plurality of similar units A may be installed in any other body of water in which it is desired to screen or filter such liquid. Further, depending upon the type of body of water and also the purpose for which the screening is to be done, that is, the use of the water, various types of supporting structures may be used without departing from the scope of the invention.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An apparatus for removing debris, trash and other material from a moving body of water comprising a platform above the body of water for receiving debris, trash and other material, a screen adapted to be submerged in said body of water and below said platform for screening the water, said screen being inclined rearwardly and sloping upwardly and including at least two guide members adjacent and substantially parallel thereto, a drive unit, means for supporting said drive unit, a pair of endless chains, means for supporting said endless chains in a spaced apart parallel relationship extending vertically before said screen and approximately adjacent thereto, said means for supporting said endless chains including a pair of spaced inner and outer sprockets aligned with each other and positioned above the water for supporting each of said endless chain whereby each of said endless chains forms a continuous path in the shape substantially of a right triangle perpendicular to said screen with the hypotenuse side of said triangle being parallel to said screen and the legs of the triangular path being substantially parallel and vertical in relation to the water, horizontal guide means positioned between each sprocket of said pair of spaced apart sprockets and in substantial alignment therewith whereby said endless chains are maintained substantially horizontal along the leg of the triangular path which is parallel to the water, vertical guide means extending below and aligned with said opter sprockets above the water whereby the leg of the triangular path is formed, a plurality of raking members secured between said endless chains whereby said raking members are moved on said guide member over the face of said screen so as to collect the debris, trash or other material deposited therebefore and move the debris, trash or other material on to said platform, and means for operably connecting said drive unit to said sprockets for said endless chains.

2. The structure recited in claim 1 including guide means adjacent said screen for inhibiting the lateral movement of said raking members as said raking members are moved across said screen without interfering with the raising of said raking members above said screen should any trash, debris or other material get between said screen and said raking members, said vertical guide means positioned in relation to said screen whereby the lower end portion of each of said chains conforms to approximately the natural curvature of the chain, and said means for operably connecting said drive unit to said sprockets for said endless chains including a drive shaft connected to the outboard sprockets whereby each of said endless chains extending below the outboard sprockets is moved downwardly and the portion of each of said endless chains adjacent said screen is moved upwardly substantially parallel to said screen.

References Cited in the file of this patent

UNITED STATES PATENTS

| | | |
|---|---|---|
| 1,881,270 | Evers et al. | Oct. 4, 1932 |
| 2,696,308 | Martin | Dec. 7, 1954 |